July 27, 1954
A. M. STONER
2,684,856
APPARATUS FOR TIGHTENING CHUCKS OF POWER DRILLS
Filed March 18, 1950
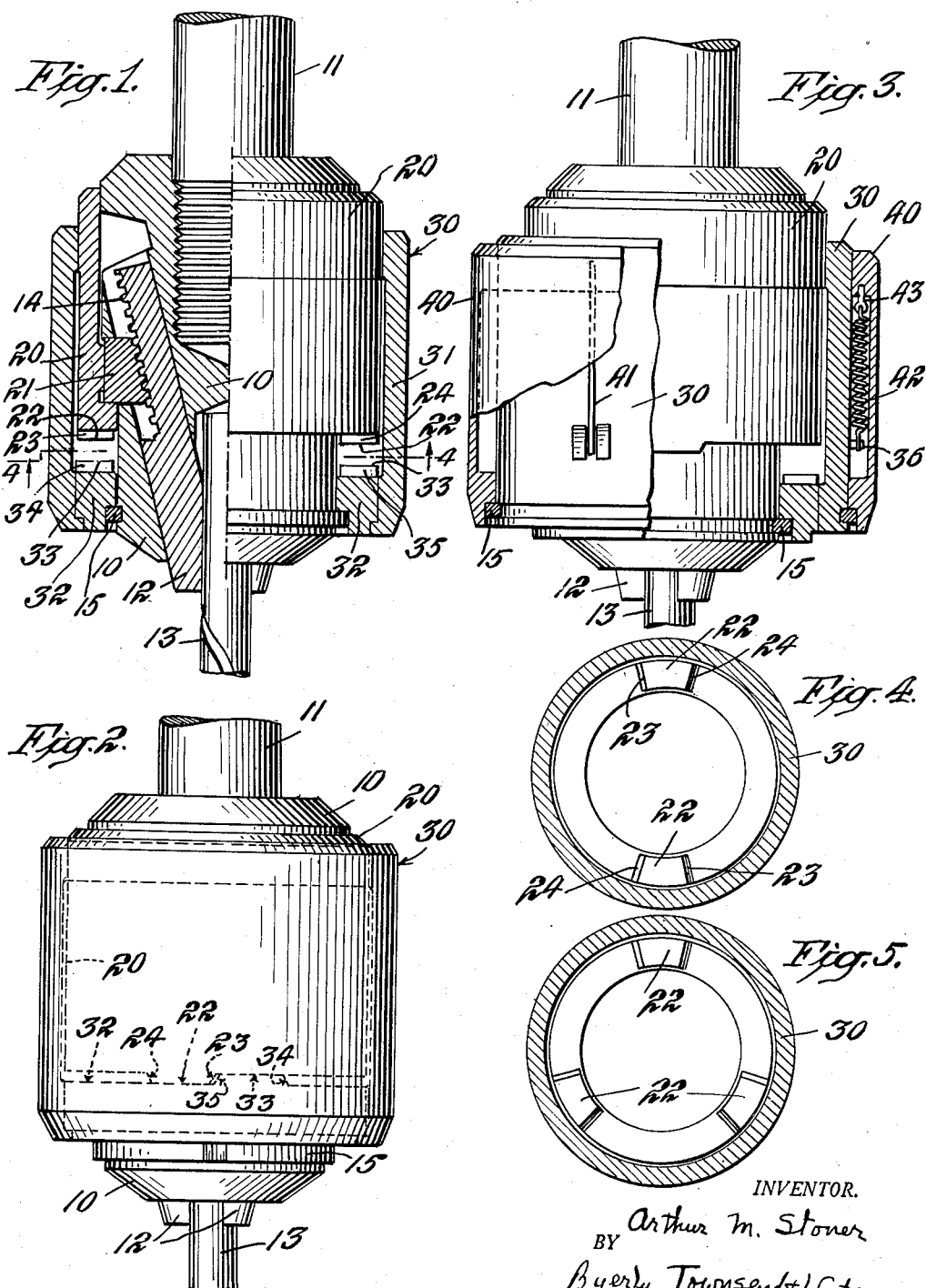
INVENTOR.
Arthur M. Stoner
BY
Byerly, Townsend & Watson,
ATTORNEYS Patented July 27, 1954

2,684,856

UNITED STATES PATENT OFFICE 2,684,856

APPARATUS FOR TIGHTENING CHUCKS OF POWER DRILLS

Arthur M. Stoner, West Hartford, Conn., assignor, by mesne assignments, to The Jacobs Manufacturing Company, West Hartford, Conn., a corporation of New Jersey Application March 18, 1950, Serial No. 150,495

8 Claims. (Cl. 279—61)

This invention relates to an apparatus for tightening the chucks of power drills.

A conventional device for holding a drill or other tool consists of two relatively turnable members and a series of jaws or grippers which may be tightened on a tool which is inserted in them by causing relative rotation between said two members. The word "chuck" is used herein to designate such a device. The present invention is not concerned with the mechanism by which the opening and closing of the chuck jaws are effected by relative rotation of the chuck members and is applicable to chucks having any means for this purpose.

The object of the invention is to utilize the power applied to a shaft on which one member of a chuck is mounted as means for tightening the jaws of the chuck upon a drill or other tool or for loosening the jaws. The fact that the tool shaft of a power drill is rotated at a high speed and usually with less torque than is required for tightening a chuck has heretofore prevented any satisfactory and convenient use of this power to operate the chuck. Thus it is both difficult and dangerous to attempt to tighten the chuck of a power tool by frictional retarding of one member of the chuck while the other member is being rotated by power.

The apparatus which I have invented avoids the difficulties and dangers of previous attempts to use the power driving a tool shaft to operate a chuck. It operates to retard the rotation of the one member of the chuck during power rotation of the other member by what may aptly be termed a series of hammer blows. This is accomplished by bringing an inertia member into the path of a projection on one member of the chuck during rotation of the chuck by the power applied to its other member. The impact causes instantaneous retarding of the rotation of the one member of the chuck and at the same time moves the inertia member away from the projection on the chuck so that such instantaneous retarding as it has exerted depends upon its inertia. The inertia member is returned to the path of the projection so that it is repeatedly struck by the projection. By this method of operation, the degree to which the chuck is tightened may be nicely regulated by regulating the amount of inertia of the inertia member and the number of hammer blows used. The same operation may be used to loosen the chuck by merely causing a rotation of the power shaft in the reverse direction and applying the inertia member as before.

It is obvious that inertia members of numerous different forms and mounted in numerous different ways may be used in my apparatus.

In the form which I now consider most desirable, the apparatus comprises the combination of a chuck having a small projection or dog with an inertia member consisting of a sleeve freely mounted on the chuck and having a projection or dog which may be positioned to lie in the path of the dog on the chuck. The chuck dog is formed on the secondary member of the chuck, by which I designate the one of the two relatively rotatable members of the chuck which is not mounted on the shaft which is to drive the tool. The dogs on the chuck and the inertia member have surfaces inclined to the axis of the chuck. When the chuck is rotated by the shaft on which its primary member is mounted, a dog on the secondary chuck member engages a dog on the sleeve and strikes a glancing blow urging the sleeve to move axially as well as rotationally. A short axial movement of the sleeve induced by the impact brings its dog out of the path of the dog on the secondary member of the chuck, leaving this member free to rotate after the instantaneous retardation caused by the impact.

In order to prevent the inertia sleeve from acquiring a rotary movement and in order to return it to the axial position in which its dog will be in the path of that on the chuck, the inertia member is resiliently held against rotation and resiliently urged axially toward the position which brings its dog into the path of that of the chuck. In one form of my invention a second sleeve is freely mounted on the inertia sleeve and is held against axial rotational movement in any convenient way, as by grasping it with the hand. Springs connecting the outer sleeve and the inertia sleeve prevent rotation of the inertia sleeve and urge it back into position to be struck by the chuck after each blow.

While the outer sleeve and springs for applying the necessary resilient forces to the inertia sleeve may be used in the apparatus, I have ascertained that they are not necessary and that the apparatus may be operated by grasping the inertia sleeve directly by the hand. I have found that the flesh in the palm of the hand has sufficient spring-like action to hold the inertia sleeve against rotation and return it to a position to be struck after each hammer blow, so that a uniform impacting action may be obtained without the use of any resilient means other than the hand.

The accompanying drawings show illustrative embodiments of the apparatus features of my invention and serve as a means for explaining the new method. In the drawings:

Fig. 1 is an axial section of a chuck provided with an inertia member in accordance with my invention;

Fig. 2 is a side view of the apparatus shown in Fig. 1;

Fig. 3 is a partially sectioned side view of a modified apparatus;

Fig. 4 is a section on the line 4—4 of Fig. 1 looking in the direction of the arrows and showing a pair of diametrically opposite impact dogs on the end of the secondary member of the chuck, which are similar to the corresponding impact dogs on the inertia member; and Fig. 5 is a view similar to Fig. 4 showing a modified construction in which three impact dogs are provided on each member.

The chuck shown in Figs. 1 and 2 has a primary member 10 mounted on a power shaft 11 and a secondary member 20. On the chuck is mounted an inertia sleeve 30.

The jaws 12 of the chuck are operated by relative movement of the primary and secondary members 10, 20 so that they are closed on a tool 13 by clockwise rotation of the primary member with respect to the secondary member and loosened and opened by anticlockwise rotation of the primary member with respect to the secondary member. The mechanism by which the loosening and tightening of the jaws are effected by relative rotation of the primary and secondary members is shown for illustrative purposes only. It includes inclined jaw racks 14 slidably mounted on the primary member 10 and a split nut 21 frictionally engaging the secondary member 20. The secondary member 20 has a drive fit upon the nut 21 so that, when assembled, they act as a single part. The nut has a running fit in a groove in the primary member 10, and thus serves to prevent relative axial movement of the primary and secondary members.

In accordance with my invention, the secondary member 20 of the chuck is provided at one of its ends with a projection or dog 22 having oppositely inclined impact surfaces 23, 24.

The inertia member 30 consists of a sleeve 31 having a running fit on the periphery of the secondary chuck member 20 and a ring 32 having a running fit on one end portion of the primary chuck member 10. The ring 32 has a drive fit in the sleeve 31 so that they act as a single member. On the inner end of the ring 32 is a dog 33 having oppositely inclined impact surfaces 34, 35.

The inertia member 30 is mounted for limited axial movement between an outer position in which the ring 32 engages a split ring 15 fixed on the primary member 10 of the chuck and an outer position in which the dog 22 on the secondary member 20 engages the inner end of the ring 32 and the dog 33 on the inertia member engages the end of the secondary chuck member 20.

In the form shown in Fig. 3, an outer sleeve 40 is mounted on the inertia sleeve 30. A relatively strong blade spring 41 restrains relative turning of the sleeves 30 and 40. A relatively weak tension spring 42 connected between the pin 36 on the sleeve 30 and a pin 43 on the sleeve 40 urges the sleeve 30 to its inner position when the outer sleeve 40 is drawn inward axially.

In the use of the device described, the tool 13 is inserted in the jaws 12 when the jaws are open, and the jaws are closed on the tool manually. This is done by turning the secondary chuck member 20 by hand in an anti-clockwise direction and results in giving the jaws a light grip on the tool. The manual turning of the secondary member 20 is effected by grasping the inertia member 30, in the form shown in Figs. 1 and 2, and drawing it inward to the position in which its dog 33 engages the dog 22 on the secondary member and then turning the inertia member by hand which, through engagement of the two dogs, causes a corresponding turning of the secondary chuck member 20. In the form shown in Fig. 3, the manual closing of the jaws is effected by grasping, drawing inwardly and turning the outer sleeve 40.

After the jaws have been closed on the tool by hand, power is applied to the shaft 11 to turn it and the chuck rapidly in a clockwise direction. At the same time, the outer member 40 is grasped with the hand and held against turning. The outer member 40 is then drawn inwardly so that the spring 42 draws the inertia member 30 to its inner position, bringing its dog 33 into the path of the dog 22 on the secondary chuck member. The power rotation of the chuck causes the inclined surface 23 of the dog 22 to strike the inclined surface 34 of the dog 33. The impact between these two surfaces has two effects: (1) It causes an instantaneous retardation of the secondary chuck member 20 with respect to the primary chuck member 10 on the shaft 11 which has the effect of tightening the jaws on the tool. (2) It moves the dog 33 out of the path of the dog 22 by turning the inertia member 30 slightly against the force of the spring 41 and driving the inertia member to its outer position against the force of the spring 42. The impact is so sudden that its force depends upon the inertia of the member 30 rather than upon the force of the springs.

After the inertia member 30 has been moved by the impact into its outer position, it is returned to its inner position by the spring 42 so that its dog 33 is again struck by the dog 22 on the next rotation of the chuck. The sleeve 40 is held until there have been a sufficient number of impacts to tighten the jaws on the tool to the extent desired and is then released. The inertia member 30 and the sleeve 40 then rotate with the chuck so that there is no further tightening.

When the form shown in Figs. 1 and 2 is used, the operation is the same except that the inertia member 30 is grasped directly by the hand and the described effects of the springs 41 and 42 are reproduced by the elasticity of the flesh of the hand.

Loosening of the chuck is produced in the same manner as the tightening except that, for loosening, the shaft 11 is rotated in a counter-clockwise direction.

The degree to which the chuck is tightened on the tool depends upon the force and the number of the impacts. The force of the impacts depends upon the speed of rotation of the shaft 11, the inertia of the member 30, and the angle of the impact surfaces 23, 24, 34, 35. The number of impacts depends upon the speed of rotation of the shaft 11 and the length of time during which the sleeve 30 is urged inwardly. The number of impacts per unit of time may be increased by providing more than one dog on either the member 20 or the member 30 or on each of these members.

The forces determining the degree to which the chuck is tightened are adjusted so that the chuck grips the tool tightly enough to hold it during drilling but not tightly enough to render it imposible or difficult to loosen the jaws when the tool is to be taken out.

Figs. 1, 2 and 4 show an example convenient for use on a portable electric drill having a speed of 1400 R. P. M. The inertia member 30 is of steel and its size in relation to that of the chuck is as shown in Fig. 1. The inclination of the impact surfaces 23, 24, 34, 35 to the axis is 20°. The secondary chuck member 20 and the inertia member 30 are each provided with two diametrically opposite dogs so that there are two impacts per revolution. In this case the chuck is tightened to the proper degree by holding the member 30 in its inner position for about three seconds.

Figs. 1 and 2 taken with Fig. 5 show an example for use on a portable electric drill of 1700 R. P. M. The secondary member of the chuck and the inertia member are each provided with three symmetrically spaced dogs having impact surfaces inclined at 25° to the axis. In this case also about three seconds are required for proper tightening of the jaws on the tool.

In each case described further tightening can be obtained by continuing the impacts for more than three seconds but in both cases the inertia of the member 30 and the inclination of the impact faces are such that the jaws cannot be tightened enough to prevent subsequent loosening even though the inertia member is held in for a longer period.

Besides increasing the frequency of the impact equally spaced dogs as shown in Figs. 4 and 5 have an advantage over the use of a single dog on each member as first described in that the impulses are symmetrically applied to the member 30 and so have no tendency to throw it out of alignment with the chuck.

What I claim is:

1. The combination with a chuck consisting of two relatively turnable members, tool gripping jaws and mechanism actuated by relative rotation between said two members to tighten the jaws, of a power shaft on which one turnable member of the chuck is mounted, an inertia sleeve freely mounted on the chuck, and cooperating projections on the sleeve and on the turnable member of the chuck which is not mounted on the power shaft, said cooperating projections having engaging surfaces positioned to contact when the sleeve is in one position on the chuck and inclined to urge the sleeve axially away from said position.

2. The combination with a chuck consisting of two relatively turnable members, tool gripping jaws and mechanism actuated by relative rotation between said two members for tightening the jaws, of a power shaft on which one turnable member of the chuck is mounted, an inertia sleeve freely mounted on the chuck, means for limiting axial movement of the sleeve with respect to the chuck, and cooperating projections on the sleeve and on the turnable member of the chuck which is not mounted on the shaft, said cooperating projections having engaging surfaces positioned to contact when the sleeve is in one position and inclined to urge the sleeve axially away from said position.

3. The combination with a chuck consisting of two relatively turnable members, tool gripping jaws and mechanism actuated by relative rotation between said two members for tightening the jaws, of an inertia sleeve freely mounted on the chuck, cooperating projections having inclined surfaces on one of the turnable members of the chuck and on the sleeve, and resilient means restraining rotation of the sleeve and urging its projection into the path of the projection on the said turnable member of the chuck.

4. The combination with a chuck consisting of two relatively turnable members, tool gripping jaws and mechanism actuated by relative rotation between said two members to tighten the jaws, of an inertia sleeve freely mounted on the chuck, cooperating impact projections having inclined surfaces on one of the turnable members of the chuck and on the sleeve, a second sleeve freely mounted on the inertia sleeve, a resilient means reacting between the two sleeves to restrain relative rotation and axial movement between them.

5. The combination as claimed in claim 2 in which there are equally spaced projections on one of the turnable members of the chuck and an equal number of correspondingly spaced projections on the sleeve.

6. The combination as claimed in claim 2 in which the impact surfaces of the cooperating projections are inclined at an angle of about 20° to the axis.

7. The combination as claimed in claim 6 in which said surfaces are inclined at 25° to the axis.

8. The combination with a chuck consisting of two relatively turnable members, tool gripping jaws and mechanism actuated by relative rotation between the two turnable members to tighten the jaws, a power shaft on which one of the turnable members is mounted, a projection on the other turnable member, and an inertia member positionable to be repeatedly struck by said projection on one turnable member of the chuck during rotation of the chuck by the power shaft so that the rotation of the turnable member with the projection is retarded by a series of hammer blows.

References Cited in the file of this patent

UNITED STATES PATENTS

| Number | Name | Date |
| --- | --- | --- |
| 1,251,558 | Marrow | Jan. 1, 1918 |
| 1,534,572 | Cutler | Apr. 21, 1925 |
| 1,699,359 | Hay | Jan. 15, 1929 |
| 1,764,289 | Emrick | June 17, 1930 |
| 2,406,444 | Stoner | Aug. 27, 1946 |

FOREIGN PATENTS

| Number | Country | Date |
| --- | --- | --- |
| 607,420 | Great Britain | Aug. 31, 1948 |